US006396041B1

(12) United States Patent
Vock et al.

(10) Patent No.: US 6,396,041 B1
(45) Date of Patent: May 28, 2002

(54) TEACHING AND GAMING GOLF FEEDBACK SYSTEM AND METHODS

(76) Inventors: Curtis A. Vock, 3165 - 10th St., Boulder, CO (US) 80304; Kevin J. Grealish, 18 Whitney Ave., Westwood, MA (US) 02090-2948; Robert D. Frey, 19 Still River Rd., Bolton, MA (US) 01740; George Nauck, 1207 Goldfinch Dr. No. 7, Plant City, FL (US) 33566; Charles M. Marshall, 667 N. Bradford St., North Andover, MA (US) 01845

( * ) Notice: Subject to any disclaimer, the term of this patent is extended or adjusted under 35 U.S.C. 154(b) by 0 days.

(21) Appl. No.: 09/433,122

(22) Filed: Nov. 3, 1999

Related U.S. Application Data

(63) Continuation-in-part of application No. 09/138,166, filed on Aug. 21, 1998, now Pat. No. 6,093,923.
(60) Provisional application No. 60/107,218, filed on Nov. 5, 1998.

(51) Int. Cl.[7] ........................... A63B 69/36; G01C 21/00
(52) U.S. Cl. ................. 250/206.2; 250/208.1; 473/152; 473/218; 473/270
(58) Field of Search ............... 250/206.1, 206.2, 250/208.1; 473/151, 152, 155, 156, 218, 225, 247, 266, 267, 269, 270, 271, 278

(56) References Cited

U.S. PATENT DOCUMENTS

| 4,005,261 A | 1/1977 | Sato et al. |
| 4,150,825 A | 4/1979 | Wilson |
| 4,158,853 A | 6/1979 | Sullivan et al. |
| 4,160,942 A | 7/1979 | Lynch et al. |
| 4,437,672 A | 3/1984 | Amantrout et al. |
| 4,696,474 A | 9/1987 | Tegart |
| 4,713,686 A | 12/1987 | Ozaki et al. |
| 4,828,267 A | 5/1989 | Goodrich |
| 4,893,182 A | 1/1990 | Gautraud et al. |
| 4,910,677 A | 3/1990 | Remedio et al. |
| 4,934,705 A | 6/1990 | Shirley |
| 4,951,137 A | 8/1990 | Kisou et al. |
| 5,042,815 A * | 8/1991 | Sutton .................... 473/218 |
| 5,102,140 A | 4/1992 | Vincent |
| 5,111,410 A | 5/1992 | Nakayama et al. |
| 5,131,659 A * | 7/1992 | Lindberg, Jr. ............ 473/267 |
| 5,138,322 A | 8/1992 | Nuttall |
| 5,146,577 A | 9/1992 | Babin |
| 5,160,839 A | 11/1992 | Nishiyama et al. |
| 5,163,683 A | 11/1992 | Oswald |
| 5,210,603 A | 5/1993 | Sabin |

(List continued on next page.)

Primary Examiner—John R. Lee
(74) Attorney, Agent, or Firm—Curtis A. Vock; Lathrop & Gage L.C.

(57) ABSTRACT

The invention provides a golf feedback system. A mat is used to determine player foot position, and a 3D golf tracking system tracks golf balls hit from the mat to determine (a) a ground ball track and (b) a player orientation axis, based on the foot position and relative to the mat. The system further determines information indicative of how well the ground ball track correlated to the orientation axis. Preferably, a golfer using the system is led through a plurality of pin target locations in a simulated golf game. The system evaluates and stores information such as slice and hook, accuracy, player orientation axis and ball carry distance such that the player can evaluate his/her game individually or against one or more other players. The invention can include a plurality of mats, each mat located at a different tee off position at one or more driving ranges, each mat providing player foot position at that mat, a 3D golf tracking system at each of the driving ranges for tracking golf balls hit from one ore more mats at the associated driving, and a web server for storing and collating player performance information (e.g., player orientation axis, slice, hook, distance information) for all golfers. This server is thereinafter accessible by persons connected to the server on the Internet to facilitate gaming and teaching uses.

14 Claims, 3 Drawing Sheets

U.S. PATENT DOCUMENTS

| | | |
|---|---|---|
| 5,226,660 A | 7/1993 | Curchod |
| 5,342,051 A | 8/1994 | Rankin et al. |
| 5,358,251 A * | 10/1994 | Ashton ........................ 473/269 |
| 5,398,936 A | 3/1995 | Kluttz et al. |
| 5,417,428 A * | 5/1995 | Warren ........................ 473/218 |
| 5,471,383 A | 11/1995 | Gobush et al. |
| 5,478,082 A * | 12/1995 | De Knight et al. ......... 473/218 |
| 5,489,099 A | 2/1996 | Rankin et al. |
| 5,492,328 A * | 2/1996 | Lundquist .................... 473/218 |
| 5,685,504 A | 11/1997 | Schneider et al. |
| 5,768,151 A | 6/1998 | Lowy et al. |
| 5,798,519 A * | 8/1998 | Vook et al. ............... 250/206.1 |
| 5,868,578 A * | 2/1999 | Baum ......................... 473/247 |
| 5,984,801 A * | 11/1999 | Mason ........................ 473/270 |
| 6,042,492 A * | 3/2000 | Baum ......................... 473/453 |
| 6,093,923 A * | 7/2000 | Vock et al. ............... 250/206.1 |

* cited by examiner

TEACHING AND GAMING GOLF FEEDBACK SYSTEM AND METHODS

RELATED APPLICATIONS

This application is a continuation-in-part of commonly owned and copending U.S. application Ser. No. 09/138,166 filed on Aug. 21, 1998, and U.S. Provisional Application Ser. No. 60/107,218 filed on Nov. 5, 1998, which are expressly incorporated herein by reference.

BACKGROUND

U.S. Pat. No. 5,798,519 (the '519 Patent) teaches golf ball tracking systems for driving ranges, and is expressly incorporated herein by reference.

Current driving ranges sometimes use targets and flags positioned on the driving range in an effort to make the driving range appear more like a golf course, and to provide a little entertainment to an otherwise monotonous practice. Golfers cannot, however, actually determine how well they hit the ball with respect to a target except for a subjective estimation. This assumes that the golfer can even see the ball: the distances are so far, it is sometimes difficult for golfers to see where their ball actually went.

Teaching by pros at golf driving ranges is also popular. There is currently no automated feedback available to golfers at a driving range to provide teaching and instruction feedback without a live person.

It is, accordingly, an object of the invention to provide interactive gaming and teaching at a golf driving range. Still another object is to provide electronic gaming between golfers at one or more driving ranges. Yet another object of the invention is to provide quantitative feedback to golfers at a driving range as golf teaching instruction, without the aid of a live person. These and other objects will be apparent in the description which follows.

SUMMARY OF THE INVENTION

In one aspect, the invention utilizes a 3D golf ball tracking system taught by the '519 patent. A foot position mat is placed at one or more tee off positions. The foot position mat has a plurality of sensors (e.g., switches or force sensing elements or resistors) located in the mat to spatially map objects which rest on the mat. For example, in the preferred aspect, the mat provides information suitable to define the outline of the golfer's feet on the mat. The mat can include an internal microprocessor to process and define that outline from the sensors; but preferably the mat connects to the associated reporting station (e.g., reporting station 320, FIG. 10, of the '519 patent) at that tee off position so that data from the sensors can be transmitted directly to the reporting station or central computer (e.g., the processor 316, FIG. 10 of the '519 patent).

In another aspect, the invention provides active feedback for teaching of players on the foot position mat. The player either enters in the desired target at the user station (e.g., reporting station 320), or the system assumes the target according to foot position and landing of the ball. Thereafter, the system informs the user how far she was from the desired target and, if desired, how well her foot position was relative to the target.

In this manner, the invention of certain aspects operates as an automated golfing coach.

The invention of another aspect provides network gaming between one or more golfers at a driving range, or between one or more golfers at other driving ranges. In this aspect, these multiple golfers are each playing on ranges with the 3D tracking system of the '519 Patent; and the system further tracks designated targets between players to present a unified game to the golfers. In a further aspect, a foot position mat is provided to each golfer to add another dimension (including optional real-time feedback) to the golfers during the game.

DETAILED DESCRIPTION OF THE DRAWINGS

Figure 1:
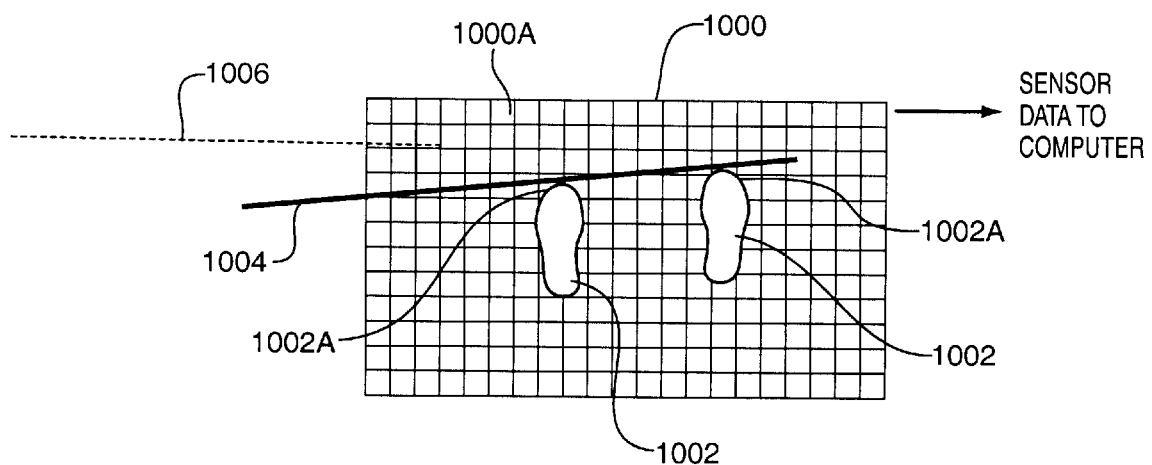
FIG. 1 shows a top view of a foot position mat constructed according to the invention and illustrating how the player orientation axis is determined.

FIG. 1 shows a foot position map 1000 constructed according to the invention to provide foot position data that enables one to map the position of the feet 1002 on the mat 1000 relative to a driving range 999. Mat 1000 preferably connects to the associated reporting station 12 (FIG. 1 of the '519 Patent) and/or to club house computer 24 (FIG. 1 of the '519 Patent) to control and assess data generated by mat 1000. By processing data from mat 1000, a player orientation axis 1004 can be determined from a line drawn from the tops 1002a of the players toes and between feet 1002, as illustrated in FIG. 1.

Data from multiple individual sensors 1000a in mat 1000 provide spatial detail such as which sensors are "closed" by being stepped upon by feet 1002. Since there are many sensors 1000a, an outline of feet 1002 is available from mat data at any moment in time. This data is output from mat 1000 into a processing computer, e.g., to computer 24 of the '519 Patent. The physical orientation of mat 1000 relative the driving range 999 thus defines the player orientation axis 1004.

The tracking system of the '519 Patent can be used to determine, exactly, the ball track in three dimensions (the "3D track"). The processing computer connected to mat 1000 thus has access to both the 3D track and the player orientation axis 1004. By projecting the ball track onto ground, a ground ball track is determined, as shown by the dotted line 1006 of FIG. 1. The angle φ between the player orientation axis and the ground ball track specifies how well the player hit the ball relative to his foot position.

Those skilled in the game of golf understand that the preferred ball track 1006 should align with the player orientation axis 1004. Note that FIG. 1 assumes that the player is standing on mat 1000 with his left side to the left (i.e., towards range 999) and that the player is hitting into the driving range 999 on the left. However, a player can just as easily turn around and hit to the right, if she is left-handed.

Mat 1000 can for example appear as any fake grass mat that appears at various driving ranges in the country; except that mat 1000 has the added feature of providing foot spatial information through sensors 1000a. When tied to the 3D tracking computer of the '519 Patent, that foot spatial information and the 3D track provide invaluable teaching information, automatically, to the golfer of feet 1002.

The reporting stations (e.g., items 28, 29 of FIG. 1 of the '519 Patent) at the tee off position of mat 1000 preferably provide active feedback to the user through a microphone disposed within the reporting station. In such an embodiment, these stations generate voice feedback such as "hit left", "hit right" and other useful teaching instructions. After several hits on mat 1000, a player can learn that his foot position is wrong.

Figure 2:
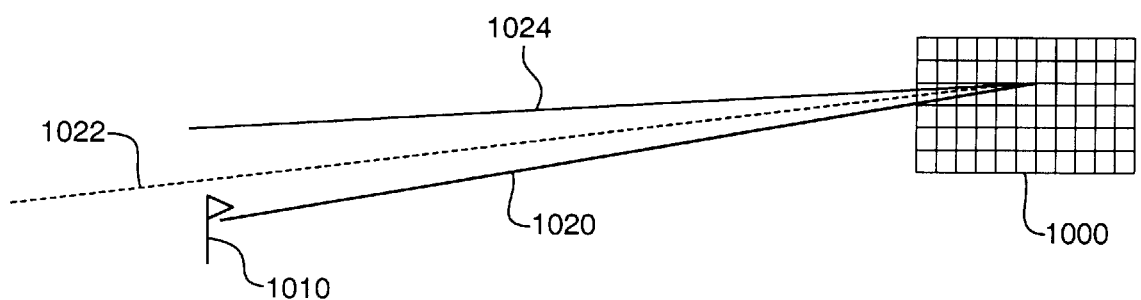
FIG. 2 is a top view illustrating the player orientation axis relative to an actual golf ball track to assess alignment to target.
Figure 3:
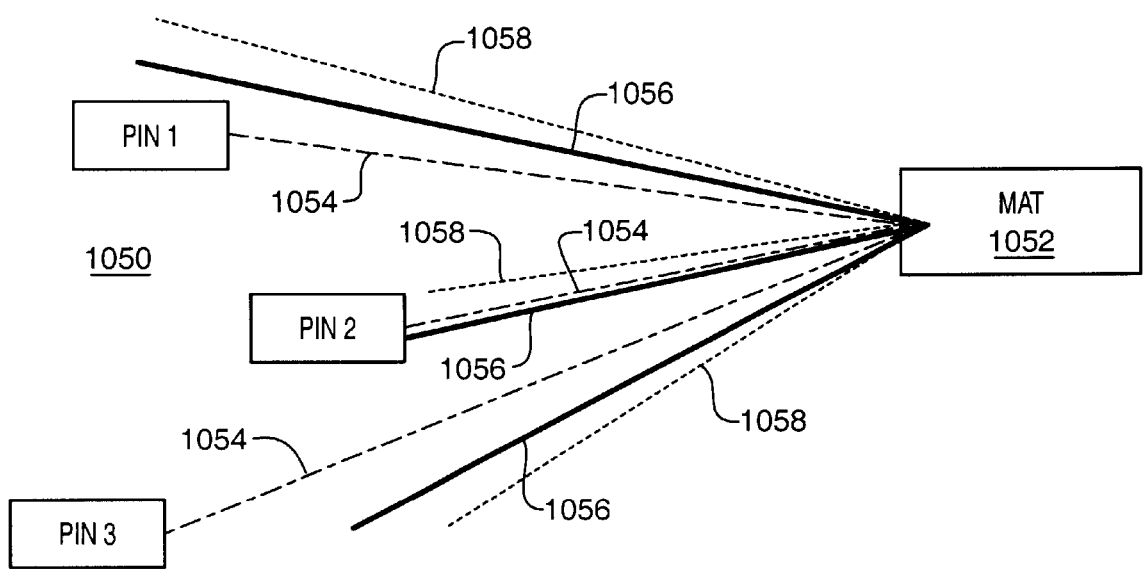
FIG. 3 illustrates a driving range constructed according to the invention to interactively play against multiple targets in teaching feedback or gaming.

As shown in FIG. 2, the system of the invention can actually define where the player should hit the ball provided the shot is perfect. That is, the correct orientation axis 1020 to target pin 1010 is defined by the alignment of the golfer's feet (illustrated in FIG. 1) with target 1010. Specifically, since mat 1000 is fixed at the location at the tee off position, its orientation relative to target 1010 is known, and thus so is the preferred orientation axis 1020. The exact positions of the targets (e.g., pin 1010) are stored in the system computer, e.g., computer 24 of the '519 Patent. Since the system computer has all the information—pin position, player orientation axis 1020 and 3D mapped golf ball ground track 1022—the system can inform the player immediately that the player is "aligned to target 1010". Other targets and locations in the driving range 999 can also be stored, e.g., in memory within the processor, so that a player can shoot towards any particular target and attain feedback thereto. FIG. 3 illustrates this further.

Those skilled in the art should appreciate that players with hooks and slices as part of their game can be incorporated into the model described herein, such that player orientation is adjusted to a particular golfer's game. FIG. 2 shows an idealized situation where the player hits straight at the pin 1010 without hook or slice in the normal game. FIG. 2 also illustrates that the system of the invention can further inform a user of an incorrect orientation axis 1024, as when the golfer is not aligned to the pin 1010.

In FIG. 3, several targets (e.g., Pins 1–3) can exist on the driving range 1050 with their locations stored in the system computer's memory. Afterall, pins 1–3 are fixed on the range 1050 (generally), so a player can target any desired pin with feedback from the system tied to the mat 1052 at the tee off position. In FIG. 3, for example, true lines of sight 1054 denote the preferred track to respective pin targets, while player orientation axes 1056 denote how the player was positioned on the mat 1052 during the hit for that respective target. The 3D tracking system of the '519 Patent tracks the golf ball and defines a ground track 1058 associated with the golf ball movement for that target hit. With all three data lines, per target, the player can assess (1) how well he places his feet relative to the target position, (2) how his hit of the golf ball tracks relative to his foot position, and (3) what kind of angle and/or distance his ball travels compared to the desired target location. Note, again, that FIG. 3 also illustrates the simple "straight" line case for hit golf balls. Those skilled in the art should appreciate that tracks 1058 can alternatively be curved to match the player's normal hit. Additionally, the orientation axes 1056 can be "tuned" to a particular player so that they may not be aligned directly to respective pins 1–3, as shown.

The information provided by the system of FIGS. 1–3 is thus useful as feedback to the user for any target in the range. The system provides active feedback as to foot position—all the player has to do is specify the desired target at the reporting station—so that she can improve how she sets up and aims for a pin. The system further informs the user of ball travel, including slice, hook, height, apogee and ball travel distance from the player. The system also informs the player of how well the ball track correlates to the player orientation axis. In FIG. 3, for example, note that the player had his best shot when aimed at Pin 2 (he was also better aimed at pin 2 in terms of foot position), and that he generally hits right of his player orientation axis, as shown for his hits to Pins 2 and 3. In the Pin 3 hit example, he hit left of his player orientation axis and was also aimed left of the target pin 3. This player can use some improvement.

The system of the invention is thus also useful in gaming. Specifically, information captured by the invention can be stored, shared and compared to users at other ranges, even at other sides of the world. Consider FIG. 4.

Figure 4:
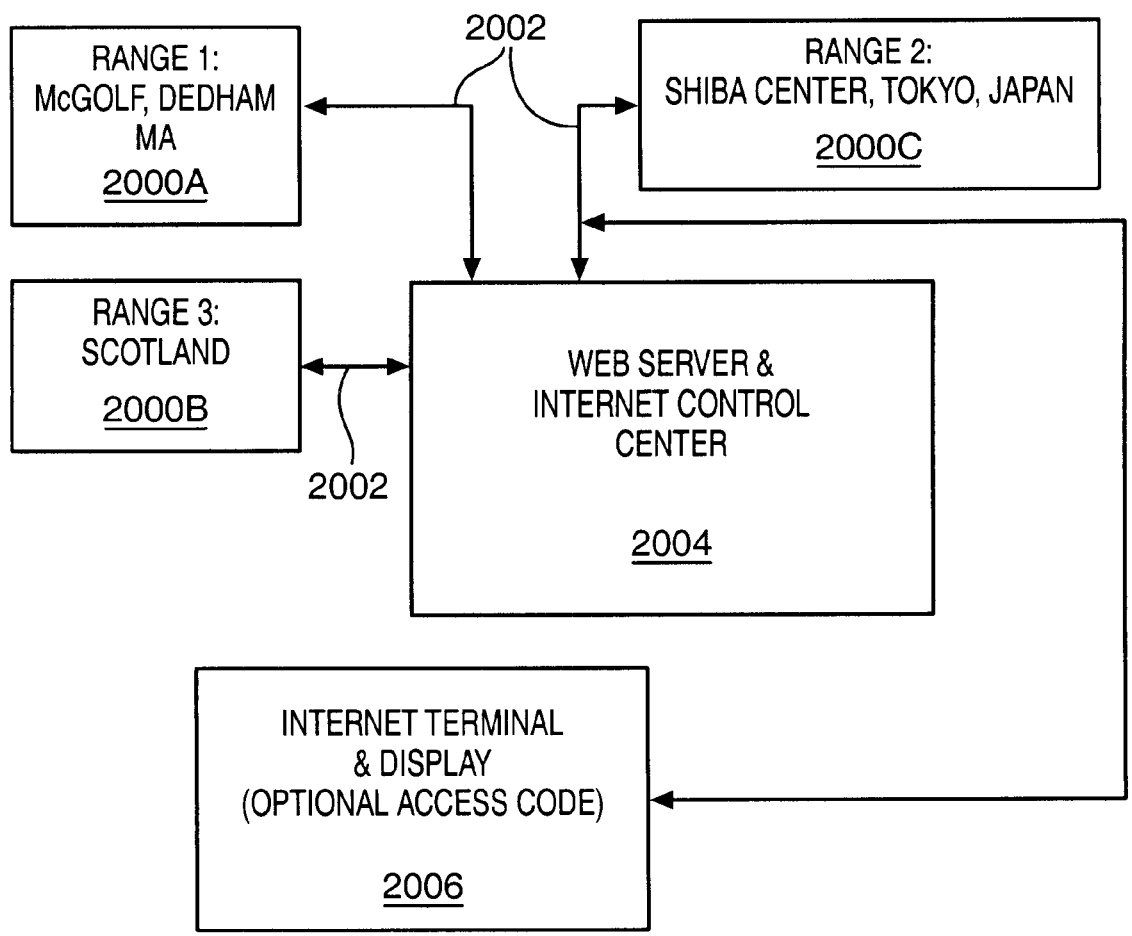
FIG. 4 shows an Internet gaming system constructed according to the invention for implementing gaming between multiple courses, in accord with the invention.

In FIG. 4, three ranges 2000 (one famous range 2000*a*, McGolf™, in Dedham, Mass., range 2000*b* in Japan and a range 2000*c* in Scotland) are tied together via the Internet 2002. Preferably, one central server 2004 collates data (such as which user is playing at which range and tee off position, target pin, accuracy, slice information, ball travel distance, player orientation axis) from each range 2000 and reformats the data so that a user connected to an Internet terminal and display 2006 can access the combined gaming results for those participating ranges. Optionally, such a user can be forced to use an access code to enter the gaming results at the web server 2004 so that gaming is limited to paying ranges and individuals, for example. Note that to the Internet terminal and display 2006 can be at one of the ranges 2000 or a computer at the user's home; and further that a print out of results for one or more ranges 2000 can be obtained therethrough. In this manner, gaming can occur in several ways, and efficiently.

Preferably, server 2004 is tied to each of the system computers tied to each range, e.g., system computer 24 of the '519 Patent.

Gaming can also occur locally, or "intra-range." We have already described how a particular range knows target locations and how well a user hits to that location. In this embodiment, the system further "suggests" a pin target that the user should hit towards. In this manner, the system guides one or more users to a particular pin, gauges their shot results, compares the results to one or more players at the range (or to one or more players in a network such as shown in FIG. 4). Players can thus participate in a game, making the driving range more interactive and competitive.

Exemplary Intra-Range Gaming Methodology

1) Start game, inform players at tee-off positions and re-set reporting station
2) Inform each player which pin to target and to proceed and hit the ball
3) Record player orientation axis, per player, and track golf ball in 3D for all players
4) Assess shot result of player relative to designated pin
5) Inform user and/or catalog result in the range computer and/or in web server
6) Proceed to the next target, and repeat 1–5 for other targets in this game
7) Compare results per target and/or for entire game to gauge one player to another.

Users of the game methods of the invention are thus engaged in the game of golf with other players, near and far, and simultaneously (or at different times, if desired). Accordingly, two players at a particular range, or two players at two different ranges (even on different continents) can play against each other. Two players can also play respective games at different ranges and at different times. By way of example, a player in Massachusetts can compete against a player in Scotland for a pre-defined gaming pattern (e.g., hit pin 1 at 50 yards, hit pin 4 at 150 yards, hit pin 9 at 25 yards, drive the ball as far as possible for hit 10, and so on). These players can do these patterns at their own time and pace; and results can be stored and compared at the completion of the game.

In view of the foregoing, what is claimed is:

1. A golf feedback system, comprising: a mat for determining player foot position, a 3D golf tracking system for tracking golf balls hit from the mat and for determining (a) a ground ball track and (b) a player orientation axis, based on the foot position and relative to the mat, and means for determining information indicative of how well the ground ball track correlated to the orientation axis.

2. A feedback system of claim 1, further comprising means for storing a plurality of pin target locations and for sequentially leading a player on the mat to hit one or more golf balls to the locations in a simulated golf game, the system evaluating and storing information such as slice and hook, accuracy, player orientation axis and ball carry distance wherein the player can evaluate his/her game individually or against one or more other players.

3. A system of claim 1, further comprising means for informing the player of the information so that the user can improve his/her stance and swing form or posture.

4. A system of claim 3, wherein the means for informing comprises a reporting station that reports the information to the player by sound and/or display.

5. A system of claim 3, wherein the means for informing comprises a computer and printer which prints the information for the player summary form at the end of play.

6. A system of claim 1, further comprising means for collating the information on a web server so that the player can access collated gaming information about his play at the mat.

7. A golf feedback system, comprising: a plurality of mats, each mat located at a different tee off position at one or more driving ranges, each mat providing player foot position at that mat, a 3D golf tracking system at each of the driving ranges for tracking golf balls hit from one ore more mats at the associated driving range and for determining (a) a ground ball track and (b) a player orientation axis for each player at a mat, based on the foot position and relative to the mat, means for determining information indicative of how well the ground ball track correlated to the orientation axis, and a web server for storing and collating player performance information (e.g., player orientation axis, slice, hook, distance information), the server being accessible by persons connected to the server by the Internet.

8. A method of providing feedback to a golfer at a driving range, comprising the steps of determining player foot positions at a tee off position, tracking golf balls hit from the tee off position to determine a golf ball track, determining a player orientation axis based on the foot position and relative to the tee off position, and determining information indicative of how well the ground ball track correlated to the orientation axis.

9. A method of claim 8, further comprising storing a plurality of pin target locations relative to a tee off position, sequentially instructing a player at the tee off position to hit one or more golf balls to the locations in a simulated golf game, and evaluating and storing information including one or more of slice and hook, accuracy, player orientation axis and ball carry distance such that the golfer can evaluate his/her game individually or against one or more other players.

10. A method of claim 8, further comprising the step of informing the golfer of the information so that the golfer can improve his/her stance and swing form or posture.

11. A system of claim 10, further comprising the step of utilizing a reporting station to inform the golfer.

12. A system of claim 8, further comprising utilizing a computer and a printer which prints the information for the golfer in summary form at the end of play.

13. A method of claim 8, further comprising the step of collating the information on a web server so that the golfer can access collated gaming information about his play at the mat.

14. A method of exchanging information between a plurality of golfers at one or more driving ranges, comprising the steps of: determining foot positions of each of the golfers at tee off positions at the ranges, tracking golf balls hit from one ore more of the tee off positions to determine a ground ball track and a player orientation axis for each of the golfers, determining information indicative of how well the ground ball track correlated to the orientation axis for each of the golfers, and storing and collating player performance information on a server.

\* \* \* \* \*